UNITED STATES PATENT OFFICE.

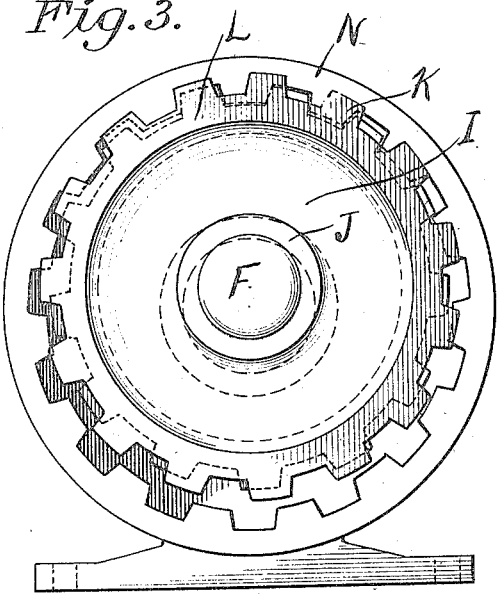
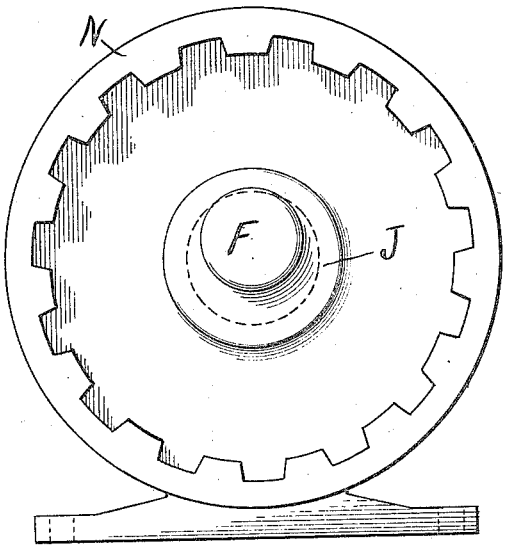
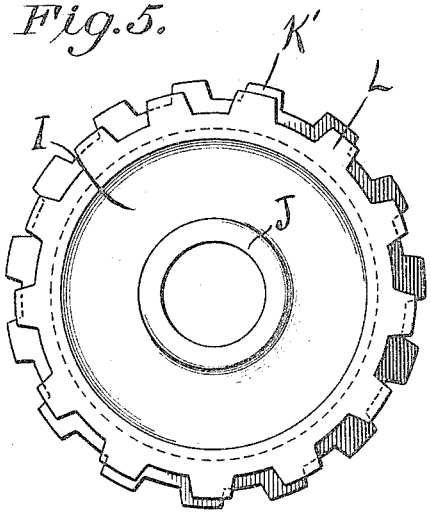
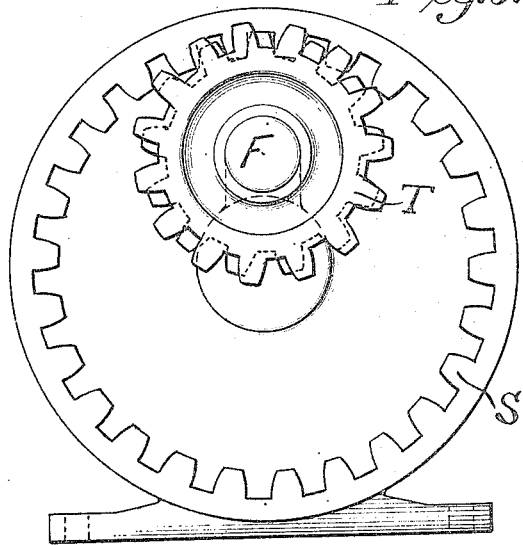

DAVID H. HATLEE, OF MECHANICSVILLE, NEW YORK.

SPEED-REDUCER.

1,192,627.  Specification of Letters Patent.  Patented July 25, 1916.

Application filed December 9, 1915. Serial No. 65,966.

*To all whom it may concern:*

Be it known that I, DAVID H. HATLEE, a citizen of the United States, residing at Mechanicsville, in the county of Saratoga and State of New York, have invented certain new and useful Improvements in Speed-Reducers; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to new and useful improvements in speed reducing gear apparatus and especially in the provision of a planetary gear adapted to impart a reduced motion from a driving shaft to a gear upon a driven shaft.

The invention consists of a simple and efficient apparatus of this nature having various details of construction and combinations and arrangements of parts which will be hereinafter fully described, shown in the accompanying drawings and then specifically defined in the appended claim.

My invention is illustrated in the accompanying drawings, in which:—

Figure 1:
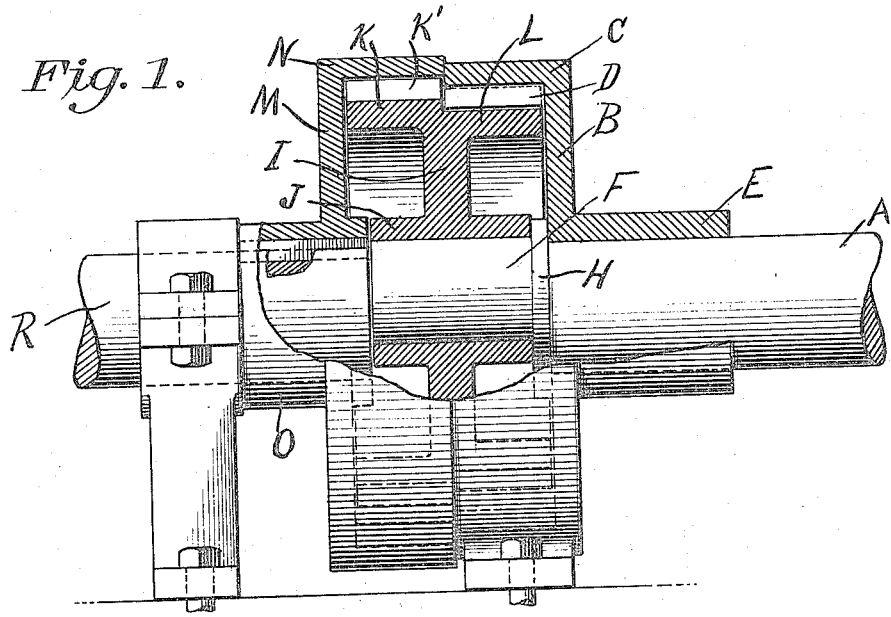
Figure 2:
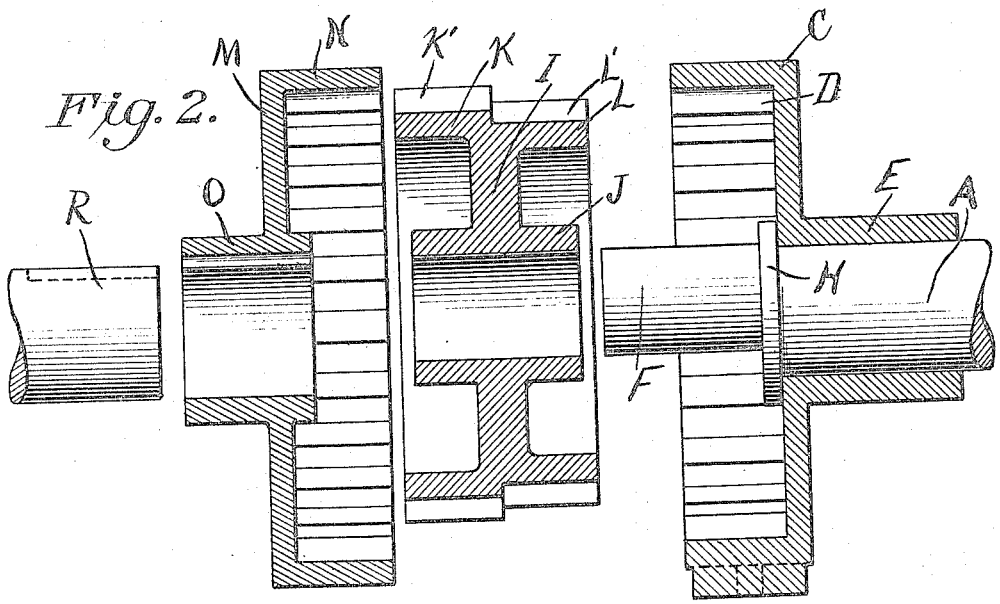

Figure 1 is a side elevation of a device, partly in section. Fig. 2 is a sectional view, the parts being disassembled. Fig. 3 is a face view of the internal gearing, the left hand gear being removed. Fig. 4 is a side elevation of the stationary gear. Fig. 5 is a detail view of the planetary driving gear. Fig. 6 is a view showing the device arranged for different speeds than that shown in Fig. 3.

Reference now being had to the details of the drawings by letter, A designates a driving shaft and B is a stationary gear disk having a circumferential flange C, the inner surface of which has teeth D, the shaft being journaled in the laterally projecting hollow hub portion E. The shaft is provided with a crank F which is fastened eccentrically to the shaft A and terminating at its upper end in a shaft H. A double planetary gear wheel, designated by letter I, is provided with a hub portion J which is journaled upon the crank F and is provided with two flanges, designated by letters K and L, the former of which is provided with circumferential teeth K' and the latter with teeth L', the teeth L' being adapted to engage with the teeth formed on the inner surface of the flange C, while the teeth K' engage teeth upon the inner surface of the flange N of the rotatable wheel M. The wheel M has a hub O which is keyed to the shaft R.

In operation, when the shaft A is rotated, the planetary gear member I is given a rotary movement incident to the crank F turning in the hub portion thereof, causing the teeth L' to engage the teeth upon the inner circumference of the flange C and, in the planetary movement of the gear wheel I, the teeth K' will engage the teeth upon the inner periphery of the flange N, causing a greatly reduced movement to be imparted to the gear wheel I and in turn to the shaft R which is keyed to said wheel M.

In Fig. 6 of the drawings, I have shown a slight modification of my invention, in which means is illustrated for differentiating the speed from that obtained in the construction before described and as illustrated in Figs. 1 and 2 of the drawings, and in which modification the crank carried a double gear wheel, designated by letter T, having two series of teeth thereon, one series intermeshing with the teeth upon the stationary wheel S, while the other series engages teeth upon the driven wheel, not shown. It will be evident that, if desired, friction gearing may be substituted for the positive gearing.

What I claim to be new is:—

A speed reducing gear, consisting, in combination with a shaft, a gear wheel having a hub projecting in opposite directions and keyed to said shaft and provided with an interiorly toothed flange, a second gear wheel with a hollow hub and a flange with internal teeth, the said flanges being of different diameters, a driving shaft journaled in said hollow hub, a crank pin projecting eccentrically from the end of the driving shaft and extending beyond the marginal edge of the flange of the wheel on which it is mounted, a planetary gear having a hub journaled upon said crank pin, the end of the pin being flush with one end of the hub of the planetary gear, and bearing against the adjacent end of the shaft to which said gear wheel is keyed, the hub portion of the planetary gear bearing against the end of the projecting hub of the adjacent gear, said planetary gear being provided with two series of staggered teeth, each series being of different diameters and designed to conform to and engage respectively the teeth upon the flanges of said wheels.

In testimony whereof I hereunto affix my signature in presence of two witnesses.

DAVID H. HATLEE.

Witnesses:
 FRANKLIN H. HOUGH,
 E. F GIBBS.